US011480790B2

(12) United States Patent
Clark et al.

(10) Patent No.: US 11,480,790 B2
(45) Date of Patent: Oct. 25, 2022

(54) DISPLAY ADJUSTMENTS

(71) Applicant: HEWLETT-PACKARD DEVELOPMENT COMPANY, L.P., Houston, TX (US)

(72) Inventors: Alexander Wayne Clark, Houston, TX (US); Brandon James Lee Haist, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1075 days.

(21) Appl. No.: 16/077,196

(22) PCT Filed: Jun. 14, 2017

(86) PCT No.: PCT/US2017/037400
§ 371 (c)(1),
(2) Date: Aug. 10, 2018

(87) PCT Pub. No.: WO2018/231213
PCT Pub. Date: Dec. 20, 2018

(65) Prior Publication Data
US 2021/0208393 A1 Jul. 8, 2021

(51) Int. Cl.
G02B 27/01 (2006.01)
G01B 11/24 (2006.01)
(Continued)

(52) U.S. Cl.
CPC .......... *G02B 27/0149* (2013.01); *G01B 11/24* (2013.01); *G01L 15/00* (2013.01);
(Continued)

(58) Field of Classification Search
USPC .......................................................... 348/135
See application file for complete search history.

(56) References Cited

U.S. PATENT DOCUMENTS 4,526,473 A * 7/1985 Zahn, III ............... G04B 47/00
340/309.16
8,605,008 B1 12/2013 Prest et al.
(Continued)

FOREIGN PATENT DOCUMENTS

CN 105009039 10/2015
CN 106104361 11/2016
(Continued)

OTHER PUBLICATIONS

Davies, "Oculus Rift Vs. HTC Vive Vs. PlayStation VR", Retrieved from internet—https://www.tomshardware.co.uk/vive-rift-playstation-vr-comparison, review-33556-4.html. May 16, 2016, 16 Pages.

*Primary Examiner* — Behrooz M Senfi
(74) *Attorney, Agent, or Firm* — Brooks Cameron & Huebsch PLLC

(57) ABSTRACT

Example implementations relate to display adjustments. For example, a non-transitory computer readable medium storing instructions executable by a processing resource to sense a contour of an object using a sensor of a display. The instructions can cause the processing resource to determine a contour of a perimeter of the display that fits a portion of the shape of the object. The instructions can cause the processing resource to adjust the perimeter of the display to the determined contour of the perimeter via an actuator of the display.

19 Claims, 5 Drawing Sheets

(51) Int. Cl.
*G01L 15/00* (2006.01)
*G06F 1/16* (2006.01)
*G06F 3/01* (2006.01)
*H04N 5/225* (2006.01)

(52) U.S. Cl.
CPC ............ G06F 1/163 (2013.01); G06F 3/011 (2013.01); H04N 5/2257 (2013.01)

(56) References Cited

U.S. PATENT DOCUMENTS

| | | | | |
|---|---|---|---|---|
| 9,189,829 | B2* | 11/2015 | Komori | G02B 27/0172 |
| 9,547,372 | B2* | 1/2017 | Saito | G06F 3/017 |
| 9,642,749 | B2 | 5/2017 | McNeal et al. | |
| 10,559,135 | B1* | 2/2020 | Price | G06T 19/20 |
| 2001/0012001 | A1 | 8/2001 | Rekimoto et al. | |
| 2011/0264928 | A1* | 10/2011 | Hinckley | G06F 1/169 |
| | | | | 713/300 |
| 2012/0154131 | A1* | 6/2012 | Lee | B25J 13/025 |
| | | | | 340/407.1 |
| 2012/0255104 | A1* | 10/2012 | Didier | A61F 9/025 |
| | | | | 2/426 |
| 2014/0152558 | A1* | 6/2014 | Salter | G09G 5/377 |
| | | | | 345/157 |
| 2014/0275935 | A1* | 9/2014 | Walsh | A61B 3/0083 |
| | | | | 600/398 |
| 2014/0300633 | A1* | 10/2014 | Sako | G06V 20/20 |
| | | | | 345/633 |
| 2015/0202087 | A1 | 7/2015 | Chen | |
| 2015/0234189 | A1* | 8/2015 | Lyons | G02B 27/017 |
| | | | | 345/174 |
| 2015/0338921 | A1 | 11/2015 | Birnbaum et al. | |
| 2015/0363979 | A1* | 12/2015 | Takano | G02B 27/0093 |
| | | | | 345/633 |
| 2016/0044298 | A1* | 2/2016 | Holz | G06F 3/011 |
| | | | | 348/47 |
| 2016/0261300 | A1 | 8/2016 | Fei et al. | |
| 2018/0173323 | A1* | 6/2018 | Harvey | G06F 3/014 |
| 2019/0279428 | A1* | 9/2019 | Mack | G06T 7/90 |
| 2021/0174570 | A1* | 6/2021 | Bleyer | G06T 15/04 |

FOREIGN PATENT DOCUMENTS

| | | |
|---|---|---|
| CN | 206115030 | 4/2017 |
| CN | 206193357 | 5/2017 |
| EP | 2468464 A1 | 6/2012 |
| WO | 2015116220 A1 | 8/2015 |
| WO | WO-2007039691 | 4/2017 |

\* cited by examiner

DISPLAY ADJUSTMENTS

BACKGROUND

Headsets may be used in virtual reality (VR) and/or augmented reality (AR) systems. VR and/or AR headsets may be worn by a user and may include displays to provide a "virtual" and/or "augmented" reality to the user by providing images, screens, and/or other visual stimuli to the user via the displays.

DETAILED DESCRIPTION

Head mounted displays may be used in virtual reality (VR) and/or augmented reality (AR) systems. In some examples, a VR system may cover a user's eyes and provide visual stimuli to the user via a display, thereby substituting a "virtual" reality for actual reality. The VR system may allow the user to interact with the "virtual" reality world through games, educational activities, group activities, and the like.

An AR system may provide an overlay transparent or semi-transparent screen in front of and facing toward a user's eyes such that reality is "augmented" with additional information such as graphical representations and/or supplemental data. For example, an AR system may overlay transparent or semi-transparent weather information, directions, and/or other information on an AR display for a user to examine. VR/AR headsets may be used in many different fields and/or for many different applications. For example, VR/AR headsets may be used in gaming, aviation, engineering, medicine, geopositioning, training, military, government (e.g., fire, police, etc.), and sports, among other fields.

An example of a VR/AR device may include a display and a strap and/or head portion coupled to a display screen. The display can include a housing that includes a display screen (e.g., an LCD display screen). The strap may facilitate keeping the display in a specific position on a user's head such that the user is able to see the visual stimuli on the display. If there are gaps between the user and the display, light can leak onto the display screen of the display and affect the user's experience. For example, the light can shine onto the display screen and obscure images displayed on the display screen of the display. The light can distract the user's attention and detract from the VR/AR experience. By limiting light leakage on the display screen, the user experience and the clarity of the images can be improved.

The display can include cameras and/or a sensor. The sensor (such as infrared (IR) sensors) can receive signals (e.g., sensory inputs) that determine a shape and/or contour of an object, such as a user of the display. The shape and/or contour can include the shape and/or contour along points of the object's surface that can come in contact with a perimeter of the display. A contour of the perimeter of the display can be adjusted to match the contour of the object to minimize light leakage and reduce an effect on the VR/AR experience.

Examples of the disclosure include apparatuses, systems, and methods for display adjustments. In some examples, an apparatus may include a display with a sensor. In some examples, the apparatus may include IR cameras in the display.

Figure 1:
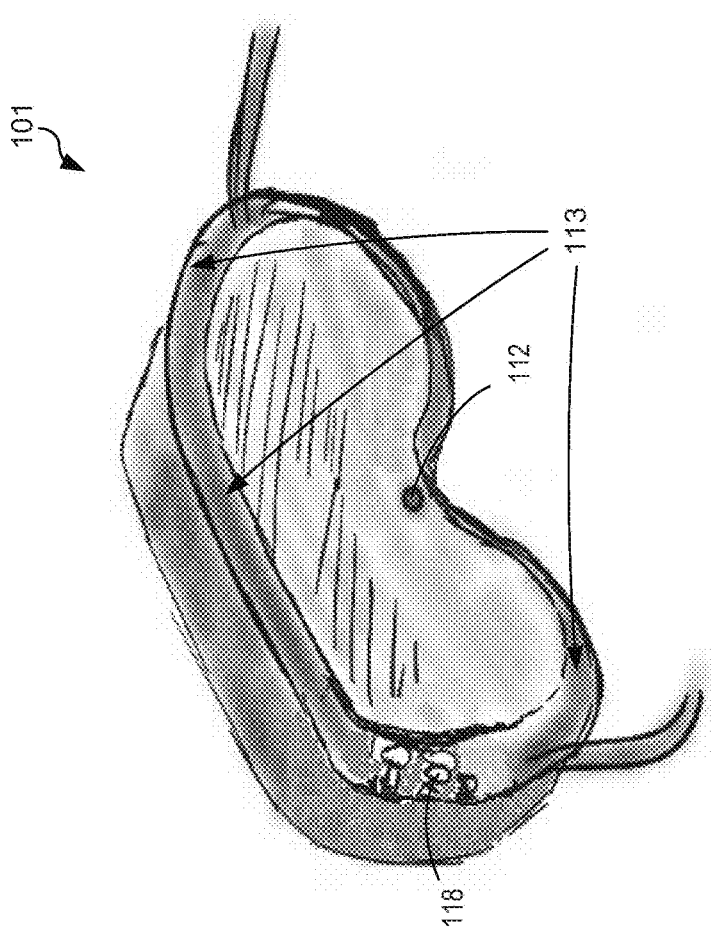
FIG. 1 illustrates an example of a display consistent with the disclosure.

FIG. 1 illustrates an example of a display 101 consistent with the disclosure. As illustrated in FIG. 1, the display 101 can include a sensor 112. The sensor 112 can be an IR sensor. The sensor 112 can be used to detect a shape and/or contour of an object in close proximity to the sensor 112. The object can include a user of the display whose eyes and face are facing toward the sensor 112 that is in the interior of the display. In some examples, the sensor 112 can bean IR camera used to detect the shape and/or contour of the object. The sensor 112 can be mounted within the display such that it faces outward toward a location of the display 101 that is shaped to receive a particular portion of the object (e.g., shaped to receive the user around the eyes and across the nose of the user).

The display 101 can include a perimeter 113, such as an edge, a border, a periphery, etc. The perimeter 113 can refer to a portion of the display 101 that comes in contact with the object, such as a user. In some examples, the perimeter 113 can include a foam padding that provides some comfort for the user. The display 101 can include an actuator 118 that allows some movement of the perimeter 113 towards or away from the object at particular points along the perimeter 113. The actuator 118 can include a linear actuator and/or an inflatable balloon.

A linear actuator can refer to an actuator that creates motion toward or away from the perimeter 113 (and therefore away or toward the object). The linear actuator can include a mechanical actuator, a hydraulic actuator, a pneumatic actuator, piezoelectric actuator, electro-mechanical actuator, etc. The display 101 is not limited to an individual actuator 118. Any number of actuators can be positioned along the perimeter 113 to move any corresponding portion of the perimeter 113 to be shaped to a contour of the object.

The inflatable balloon can be a balloon that inflates to move a particular position of along the perimeter 113 outward and toward the object. The inflatable balloon can deflate to move a particular position along the perimeter 113 inward and away from the object. In this way, the inflatable balloon can be used to achieve a particular closeness to the object. The closeness can be measured by pressure, by an amount of light leaking through between the perimeter 113 and the object at the particular point, etc.

Figure 2:
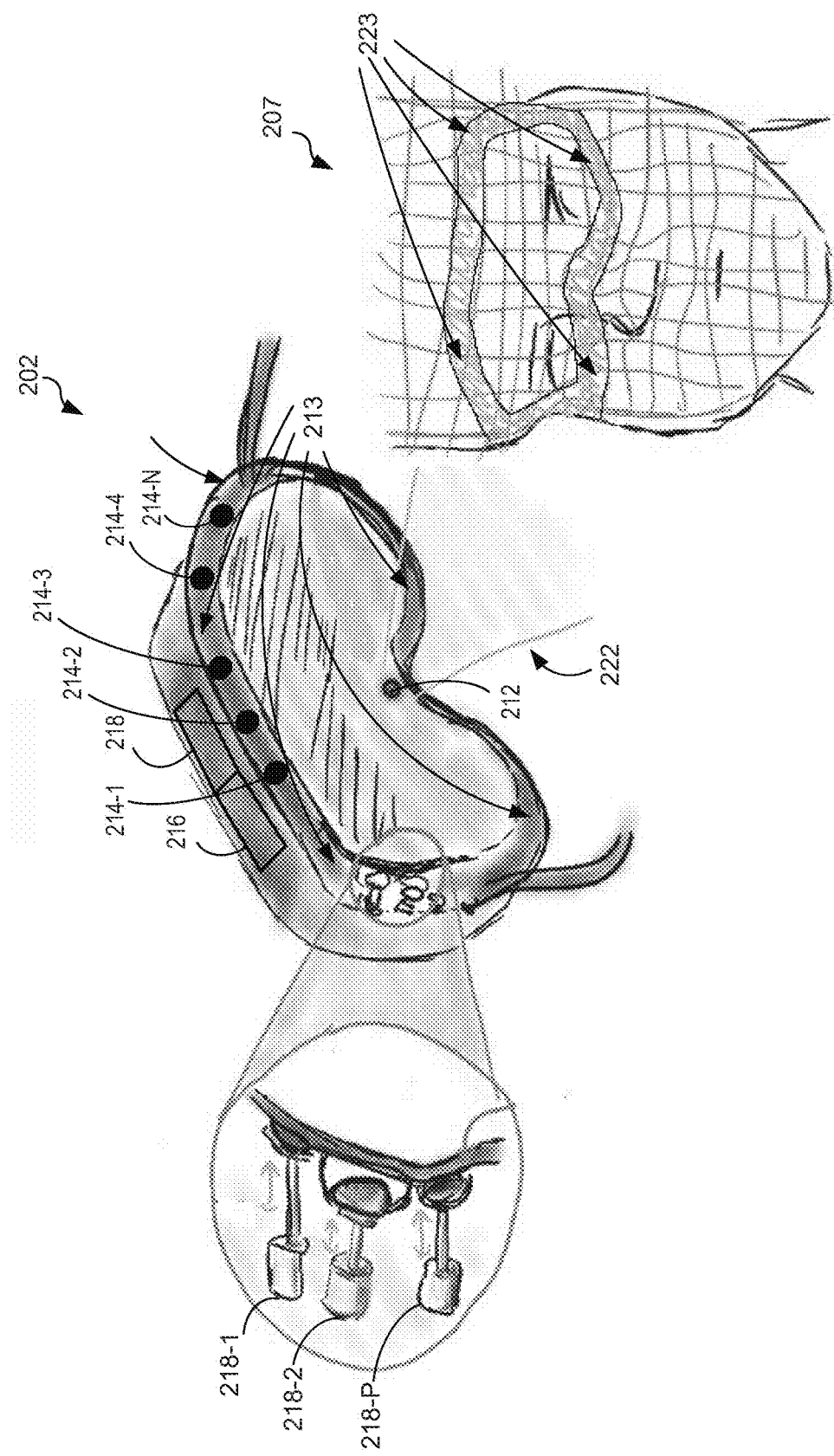
FIG. 2 illustrates an example of a display consistent with the disclosure.

FIG. 2 illustrates an example of a display 202 consistent with the disclosure. As illustrated in FIG. 2, the display 202 can include a sensor 212. The sensor 212 can be an IR sensor. The sensor 212 can send signals 222 used to detect a contour or shape of an object (e.g., user) 207 in close proximity to the sensor 212. The object 207 can be a user of the display whose eyes and face are facing toward the sensor 212 that is in the interior of the display 202. In some examples, the sensor 212 can be an IR camera used to detect the contour or shape of the object 207. The sensor 212 can be mounted within the display 202 such that it faces outward toward a location of the display 202 that is shaped to receive a particular portion of the object 207 (e.g., shaped to receive the user around the eyes and across the nose of the user).

The display 202 can include a perimeter 213, such as an edge, a border, a periphery, etc. The perimeter 213 can refer to a portion of the display 202 that comes in contact with the object at a portion 223 of the contour of the object 207. For example, the portion 223 can include a portion of the contour that surrounds the eyes and just above the nose of a user where the display 202 would contact the user. In some examples, the perimeter 213 can include a foam padding that provides some comfort for the object 207.

The display 202 can include actuators 218-1, 218-2, . . . , 218-P that allow movement of the perimeter 213 towards or away from the object at particular points along the perimeter 213. The actuators 218-1, 218-2, . . . , 218-P can each be a linear actuator and/or an inflatable balloon.

A linear actuator can refer to an actuator that creates motion toward or away from the perimeter 213 (and therefore away or toward the object). The linear actuator can include a mechanical actuator, a hydraulic actuator, a pneumatic actuator, piezoelectric actuator, electro-mechanical actuator, etc. While three actuators are illustrated, examples are not so limited. Any number of actuators can be positioned along the perimeter 213 to move any portion of the perimeter 213 to be shaped to a contour of the object.

The inflatable balloon can be a balloon that inflates to move a particular position of along the perimeter 213 outward and toward the object. The inflatable balloon can deflate to move a particular position along the perimeter 213 inward and away from the object. In this way, the inflatable balloon can be used to achieve a particular closeness to the object or seal between the object and the perimeter 213. The closeness or seal can be measured by pressure, by an amount of light leaking through between the perimeter 213 and the object at the particular point, etc.

The display 202 can include pressure sensors 214-1, 214-2, 214-3, 214-4, . . . , 214-N that can sense pressure of the object 207 against the perimeter 213 of the display 202. The pressure sensors 214-1 to 214-N can be positioned around the entire perimeter 213 at a number of locations. In some examples, the pressure sensors 214-1 to 214-N of the perimeter 213 can be positioned along portions of the perimeter 213 that are most useful in determining whether the fit of the display 202 on the object 207 creates a seal that decreases ambient light. The pressure sensors 214-1 to 214-N can be used in combination with the actuators 218-1 to 218-P to adjust the fit of the display 202 onto the portion 223 of the object 207. For example, the actuators 218-1 to 218-P can move the perimeter 213 at a number of locations until the pressures sensed by the pressure sensors 214-1 to 214-N at those number of locations are equal to a particular pressure.

As an example, a first pressure sensor 214-1 can correspond to a first actuator 218-1 located on top of, or in close proximity to, the first pressure sensor 214-1 (while not illustrated as in the same location in FIG. 2, for the purpose of this example, the first actuator 218-1 can be assumed to be at a same location or in close proximity to). In response to the first pressure sensor 214-1 sensing a sensed pressure that is less than a threshold pressure, the first actuator 218-1 can move outward and toward the object 207. As the first actuator 218-1 pushes the perimeter 213 at that point closer to the object 207, the first pressure sensor 214-1 senses increasing pressure. In response to the first pressure sensor 214-1 sensing a threshold pressure that indicates the perimeter 213 is close enough to the object 207, the first actuator 218-1 can stop moving the perimeter 213.

Likewise, in response to the first pressure sensor 214-1 sensing a sensed pressure higher than the threshold pressure, the first actuator 218-1 can move inward and away from the object 207, thereby decreasing the pressure and creating a more comfortable fit of the perimeter 213 to the object 207. A plurality of pressure sensors positioned around the perimeter 213 can each perform these operations to create a particular closeness and/or seal between the perimeter 213 and the object 207.

Figure 3:
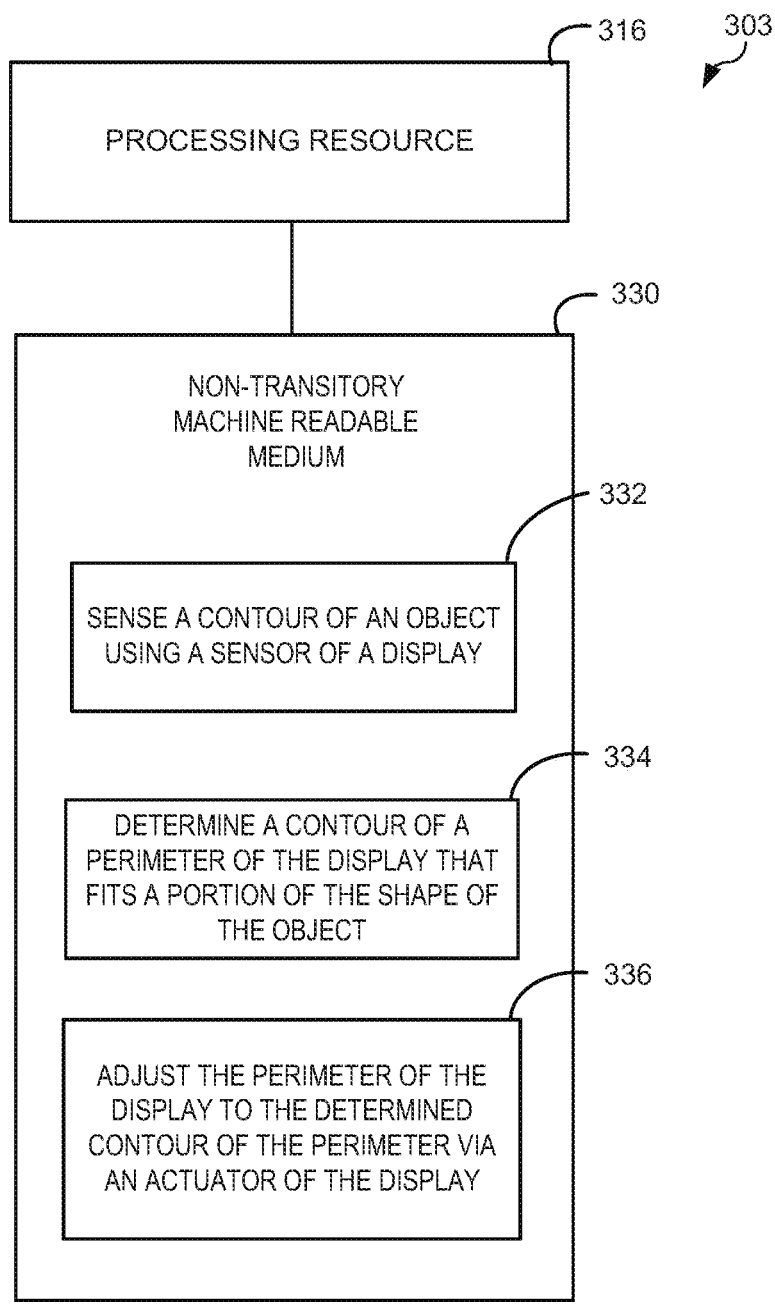
FIG. 3 illustrates a diagram of an example of a non-transitory computer readable medium and processing resource for display adjustments consistent with the disclosure.

FIG. 3 illustrates a diagram 303 of an example of a non-transitory computer readable medium 330 and processing resource 316 for display adjustments consistent with the disclosure. In some examples, the processing resource 316 may process and/or control data received from inputs of an apparatus (e.g., display 101 and 202 in FIGS. 1 and 2, respectively). A memory resource can be used to store instructions executed by the processing resource 316 to perform operations as described herein. A processing resource 316 may execute instructions stored on the non-transitory machine readable medium 330. The non-transitory machine readable medium 330 may be any type of volatile or non-volatile memory or storage, such as random access memory (RAM), flash memory, read-only memory (ROM), storage volumes, a hard disk, or a combination thereof.

The example medium 330 may store instructions 332 executable by a processing resource 316 to sense a contour of an object using a sensor of a display. (e.g., sensor 112, 212 in FIGS. 1 and 2, respectively) mounted on a display (such as a display 101 and 202 illustrated in FIGS. 1 and 2, respectively). The contour of the object can be sensed by determining a shape of the object (e.g., a user). A determination can be made as to which portions of the shape of the object may come in contact with the display and the contour of those portions can be used when adjusting the display. For example, the portions can include an area around the eyes of a user and over a bridge of the nose of the user.

The example medium 330 may store instructions 334 executable by a processing resource 316 to determine a contour of a perimeter of the display that fits a portion of the shape of the object. A comparison of the portion of the shape of the object and the perimeter of the display can be performed. The perimeter of the display can be modified based on how the perimeter would fit around the portion of the shape of the object. The comparison can be performed in segments where a portion of the perimeter is compared to a corresponding segment of the portion of the shape of the object. The comparison can be performed as a whole where the entire perimeter is compared to the entire portion of the shape of the object.

The example medium 330 may store instructions 336 executable by a processing resource 316 to adjust the perimeter of the display to the determined contour of the perimeter via an actuator of the display. The actuator can be a linear actuator, an inflatable balloon, etc. The actuator can be a mechanism that moves the perimeter outward away from the display (and toward the object) or inward toward the display (and away from the object). In this way, the fit of the display around the portions of the object that come in contact with the display can be adjusted so that light does not leak into the display and affect the viewing by the object of the display.

The example medium 330 may store instructions executable by the processing resource 316 to readjust the perimeter of the display based on information indicating how proximal the object is to the perimeter. The proximity of the object to the perimeter can be determined based on proximity or location sensors. The readjustment can be performed based on the sense proximity. For example, a proximity sensor can determine that the object is not close enough to the display and, in response, the perimeter of the display can be moved outward and toward the object at the location that is determined to not be proximal enough. In addition, the proximity sensor can determine that the object is too close to the display and, in response, the perimeter of the display can be moved inward and away from the object at the location that is determined to be too proximal.

The proximity of the display to the object can be determined based on pressure sensors so that even though a location is the same (e.g., the display is touched by the object), the pressure may be more or less depending on how tightly the object is in contact with the display. Using these pressure sensors, the perimeter of the display can be readjusted based on pressure information indicating on much the object is pushing against the perimeter of the display at a particular point of the perimeter. The pressure sensors can be distributed across the perimeter of the display at various intervals that can vary or can be equally spaced along the perimeter of the display. For example, the pressure sensors can be placed at equal distances from each other, e.g., every ½ centimeter (cm), every cm, every second cm, etc.

Figure 4:
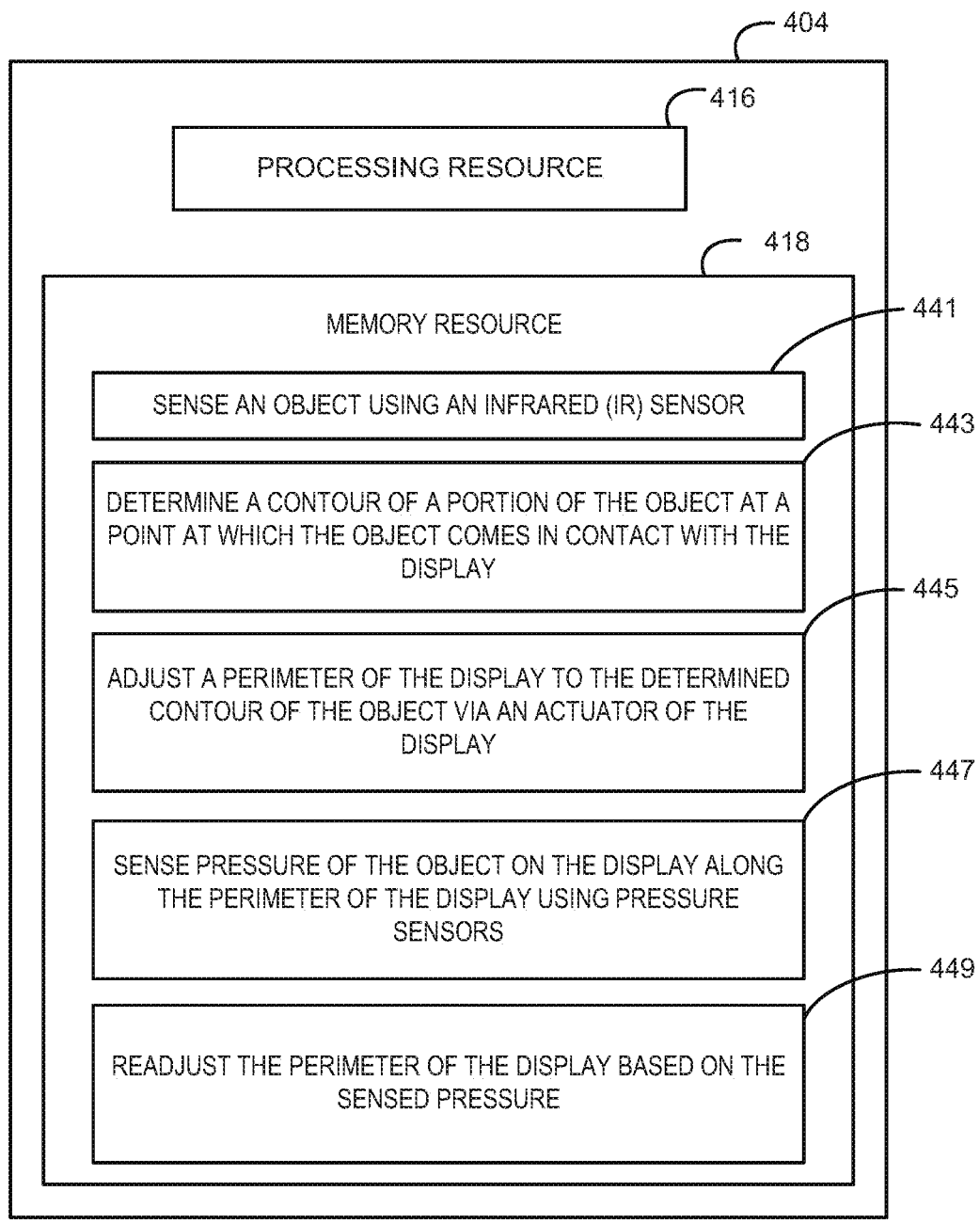
FIG. 4 illustrates a diagram of an example of a processing resource and memory resource for display adjustments consistent with the disclosure.

FIG. 4 illustrates a diagram of an example of an apparatus 404 for display adjustments consistent with the disclosure. The apparatus 404 can include a processing resource 416 and a memory resource 418. The processing resource 416 may execute instructions stored in the memory resource 418. By way of example, the memory resource 418 may be any type of volatile and/or non-volatile memory or storage, such as random access memory (RAM), flash memory, read-only memory (ROM), storage volumes, a hard disk, or a combination thereof. The memory resource 418 can be used to store data and/or instructions. The memory resource may store machine readable instructions 441, 443, 445, 447, 449 that, when executed by the processing resource 416, cause the processing resource 416 to perform a particular operation.

The memory resource 418 may store instructions 441 executable by a processing resource 416 to sense an object using an IR sensor (such as sensor 112 in FIG. 1 and sensor 212 in FIG. 2). The IR sensor can sense a contour (e.g., a structure, a shape, etc.) of the object. The IR sensor can include more than one IR sensor. For example, an IR sensor can be located on a display and face a portion of the display that would come in contact with an object. The number of IR sensors can detect, in combination, characteristics of the object. The number of IR sensors can include IR cameras.

The memory resource 418 may store instructions 443 executable by a processing resource 416 to determine a contour of the object at points at which the object comes in contact with the display. The points can refer to locations that surround the eyes and are above a nose of the object (e.g., a user). The points can be a particular distance from the eyes so that the eyes can view a display screen within the display that is centered in front of the eyes. The IR cameras can be positioned a particular distance from the object (e.g., eyes of a user) to detect a shape and contour of the object and allow a particular viewing of the display by the object.

The memory resource 418 may store instructions 445 executable by a processing resource 416 to adjust a perimeter of the display to the determined contour of the object via an actuator of the display. The perimeter of the display can be a portion such as an edge or a boundary of the display that comes in contact with the object. The object can contact the display at the perimeter such that a seal is created between the perimeter and the object to prevent light from leaking into the display. The actuator can be a linear actuator, an inflatable balloon actuator, and/or any additional types of actuators.

The memory resource 418 may store instructions 447 executable by a processing resource 416 to sense pressure of the object on the display along the perimeter of the display using pressure sensors. For example, as the object comes in contact with the object, a pressure of the object on the display can increase. As the display is moved toward the object, the pressure can continue to increase. A proper fit corresponding to a particular pressure can be achieved by moving the display closer to or further away from the object.

The memory resource 418 may store instructions 449 executable by the processing resource 416 to readjust the perimeter of the display based on the sensed pressure. For example, the perimeter can be moved outward in response to the corresponding sensed pressure between the object and the display being too low. The perimeter can be moved inward in response to the corresponding sensed pressure being too high. The position of the perimeter can be readjusted until the sensed pressures at locations of the perimeter are equal to a threshold pressure and/or within a threshold amount (e.g., 5% of the threshold pressure). In some examples, the perimeter can be readjusted until a varying number of pressures are achieved at particular points along the perimeter. For example, a particular point along the perimeter may be more comfortable with more pressure (e.g., a tighter fit) than other portions along the perimeter. As an example, the portions that the nose of the user will contact may be at a different pressure than the portions not along the nose to achieve a comfortable fit. The pressure along different portions along the perimeter may also vary to avoid light leakage along the perimeter.

Figure 5:
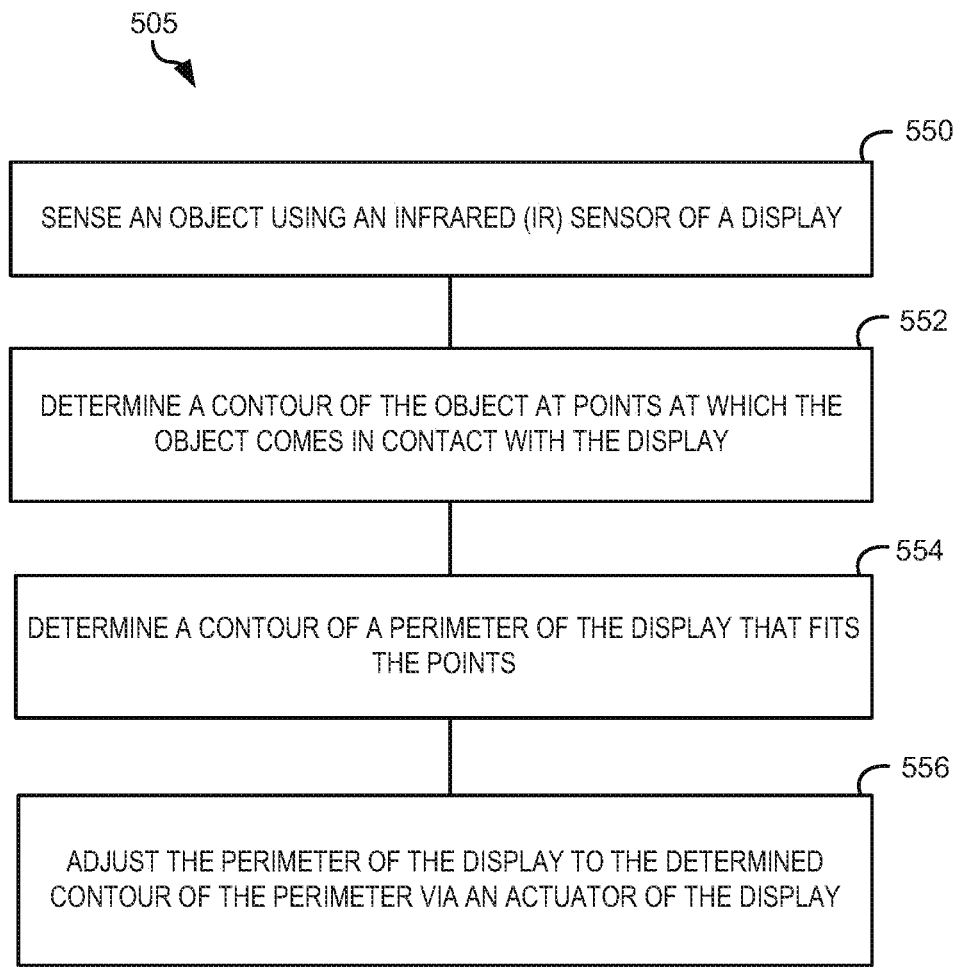
FIG. 5 illustrates a flow diagram for an example of a method for display adjustments consistent with the disclosure.

FIG. 5 illustrates a flow diagram for an example of a method 505 for estimations within displays consistent with the disclosure. At 550, the method 505 can include sensing an object using an IR sensor of a display. The IR sensor can include an IR camera. The IR sensor can be positioned to face toward a particular side of the display that an object may come in contact with. The IR sensor can detect structural characteristics, shapes, etc. of an object. The IR sensor can be mounted on a display. The IR sensor can be mounted a particular distance from the eyes of the object (e.g., a user) to allow for detection of the object at the particular distance.

At 552, the method 505 can include determining a contour of the object at points at which the object comes in contact with the display. The determination of the contour of the object can occur as the object is approaching the display. The determination of the contour of the object can occur after the object has come in contact with the display. When determining after the object has come in contact with the display, the IR sensor can sense a contour of the object that is along the perimeter (as the object has already contacted it) and determine whether the contours of the object match with the contour of the perimeter of the display.

At 554, the method 505 can include determining a contour of the perimeter of the display that fits the points. That is, a determination of how to shape the contour of the perimeter to match the contour of the object can be performed. The contour of the object to be matched can be a portion of the contour of the object that will come in contact with the display. The portion of the contour of the object can include portions around the eyes and just above the nose that the display will rest on.

At 556, the method 505 can include adjusting the perimeter of the display to the determined contour of the perimeter via an actuator of the display. The actuator can be a linear actuator, an inflatable balloon actuator, etc. Any number of actuators can be used and located throughout the perimeter of the display. Each actuator at a particular location can be used to fit a corresponding location of the object as it comes in contact with the perimeter of the display. Each actuator can move its corresponding location of the perimeter inward or outward depending on how well that location fits to the object. The fit of the perimeter to the object can be determined based on pressure information received from pressure sensors. The fit of the perimeter can be determined based on location information by location sensors (such as additional IR sensors) that indicate whether the corresponding location of the perimeter has come in close contact with the object.

In some examples, the method 505 can include adjusting the perimeter of the display such that there are no openings between the object and the perimeter of the display. The lack of openings between the perimeter and the object can be detected based on an amount of ambient light that leaks into the display. For example, an ambient light sensor can detect whether ambient light is leaking onto the display. As the perimeter is adjusted, the ambient light can be reduced. In response to the ambient light sensor detecting little to no light leaking onto the display, the adjustment can conclude.

The method 505 can include adjusting the perimeter of the display such that there is no light coming from outside the display that shows onto the display. The method 505 can include adjusting the perimeter by transposing the determined contour of the object at the number of points onto the perimeter of the display at a number of corresponding points of the perimeter. The method 505 can include adjusting the perimeter by moving the actuator of the perimeter outwards in response to the perimeter being too far in from where the object would be located. The method 505 can include moving the actuator of the perimeter inwards in response to the perimeter being too close to where the object would be located.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A non-transitory computer readable medium storing instructions executable by a processing resource to cause the processor to:
   sense a contour of an object at a plurality of points at which the object comes in contact with a perimeter of a head mounted display using a sensor of the head mounted display;
   determine a contour of a plurality of portions of the perimeter of the head mounted display that correspond to the plurality of points of the object; and
   adjust the plurality of portions of the perimeter of the head mounted display to the determined contour of the plurality of portions of the perimeter via a plurality of actuators positioned along the perimeter of the head mounted display to create a seal between the plurality of portions of the perimeter of the head mounted display and the plurality of points of the object.

2. The medium of claim 1, wherein the instructions are executable by the processing resource to adjust the perimeter of the head mounted display via a linear actuator.

3. The medium of claim 1, wherein the instructions are executable by the processing resource to adjust the perimeter of the head mounted display via an inflatable balloon actuator.

4. The medium of claim 1, wherein the instructions are executable by the processing resource to readjust the perimeter of the head mounted display based on information indicating how proximal the object is to the perimeter.

5. The medium of claim 1, wherein the instructions are executable by the processing resource to readjust the perimeter based on pressure information.

6. A method, comprising:
   sensing an object using an infrared (IR) sensor of a head mounted display;
   determining a contour of the object at a plurality of points at which the object comes in contact with a perimeter of the head mounted display;
   determining a contour of a plurality of portions of the perimeter of the head mounted display that correspond to the plurality of points of the object; and
   adjusting the plurality of portions of the perimeter of the head mounted display to the determined contour of the plurality of portions of the perimeter via a plurality of actuators positioned along the perimeter of the head mounted display to create a seal between the plurality of portions of the perimeter of the head mounted display and the plurality of points of the object.

7. The method of claim 6, wherein adjusting the perimeter of the head mounted display comprises adjusting the perimeter such that there are no openings between the object and the perimeter of the head mounted display.

8. The method of claim 6, wherein adjusting the perimeter of the head mounted display comprises adjusting the perimeter such that there is no light coming from outside the head mounted display that shows into the head mounted display.

9. The method of claim 6, wherein adjusting the perimeter comprises transposing the determined contour of the object at the plurality of points onto the perimeter of the head mounted display at the plurality of corresponding portions of the perimeter.

10. The method of claim 6, wherein adjusting the perimeter comprises:
    moving an actuator of the plurality of actuators of the perimeter outwards in response to a portion of the perimeter being too far in from where a corresponding point of the object would be located; and
    moving the actuator of the perimeter inwards in response to the portion of the perimeter being too close to where the corresponding point of the object would be located.

11. A head mounted display, comprising:
    an infrared (IR) camera;
    a processing resource; and
    a memory resource storing machine readable instructions to cause the processing resource to:
    sense an object using the IR sensor;
    determine a contour of the object at a plurality of points at which the object comes in contact with a perimeter of the head mounted display;
    adjust a plurality of portions of the perimeter of the head mounted display that correspond to the determined contour of the plurality of points of the object via a plurality of actuators positioned along the perimeter of the head mounted display to create a seal between the plurality of portions of the perimeter of the head mounted display and the plurality of points of the object;

sense pressure of the plurality of points of the object on the head mounted display along the plurality of portions of the perimeter of the head mounted display using pressure sensors; and readjust the plurality of portions of the perimeter of the head mounted display based on the sensed pressure.

12. The head mounted display of claim 11, wherein the instructions cause the processing resource to sense the object by sensing how the object is shaped.

13. The head mounted display of claim 11, wherein the instructions cause the processing resource to move a portion of the perimeter outward in response to the corresponding sensed pressure being less than a threshold pressure.

14. The head mounted display of claim 13, wherein the instructions cause the processing resource to move the portion of the perimeter inward in response to the corresponding sensed pressure being greater than a threshold pressure.

15. The head mounted display of claim 11, wherein the instructions cause the processing resource to readjust the plurality of portions of the perimeter until the sensed pressures at a number of portions of the perimeter are equal to a particular pressure.

16. The head mounted display of claim 11, wherein the head mounted display is a head mounted display of an augmented reality (AR) device.

17. The medium of claim 1, wherein the plurality of actuators are positioned at various intervals around the entire perimeter of the head mounted display.

18. The medium of claim 1, wherein the plurality of actuators are equally spaced and positioned around the entire perimeter of the head mounted display.

19. The medium of claim 1, wherein a portion of the perimeter is further adjusted by an actuator corresponding to the portion of the perimeter, wherein the actuator increases a pressure applied to the portion of the perimeter from a first pressure to a second pressure to increase the pressure the portion of the perimeter applies to a point of the object corresponding to the portion of the perimeter.

* * * * *